(12) United States Patent
Morita et al.

(10) Patent No.: US 12,154,254 B2
(45) Date of Patent: Nov. 26, 2024

(54) ANALYZER APPARATUS AND METHOD OF IMAGE PROCESSING

(71) Applicant: JEOL Ltd., Tokyo (JP)

(72) Inventors: Masaki Morita, Tokyo (JP); Naoya Tanaka, Tokyo (JP)

(73) Assignee: JOEL Ltd., Tokyo (JP)

( * ) Notice: Subject to any disclaimer, the term of this patent is extended or adjusted under 35 U.S.C. 154(b) by 429 days.

(21) Appl. No.: 17/825,272

(22) Filed: May 26, 2022

(65) Prior Publication Data

US 2023/0024406 A1    Jan. 26, 2023

(30) Foreign Application Priority Data

Jul. 20, 2021  (JP) .................... 2021-119539

(51) Int. Cl.
*G06T 5/70* (2024.01)
*G06T 5/20* (2006.01)

(52) U.S. Cl.
CPC ............... *G06T 5/70* (2024.01); *G06T 5/20* (2013.01); *G06T 2207/10061* (2013.01); *G06T 2207/10116* (2013.01)

(58) Field of Classification Search
CPC ... G06T 5/70; G06T 5/20; G06T 2207/10061; G06T 2207/10116; G06T 2207/20028; G06T 5/10; G06T 5/60; G06T 5/77; G06T 5/50; G06T 7/30; G06T 5/001; G06T 5/002; G06T 5/0004; G06T 7/001; G06T 7/10; G06T 2207/20081; G06T 2207/20084; G06T 2207/20212; G06T 2207/30148; G06T 3/4076; G01N 23/2251; G01N 21/45; G01N 21/88; G01N 21/8851; G01N 21/8867; G01N 21/9501; G01N 23/203; G01N 2223/401; G01N 2223/402; G01N 223/418; G01N 23/2206;

(Continued)

(56) References Cited

U.S. PATENT DOCUMENTS

| 2013/0206986 A1* | 8/2013 | Suzuki | H01J 37/265 250/310 |
| 2015/0109435 A1* | 4/2015 | Ito | G06T 7/001 348/126 |

(Continued)

FOREIGN PATENT DOCUMENTS

| DE | 112010005246 T5 * | 5/2013 | ............ H01J 37/244 |
| DE | 112014002951 T5 * | 3/2016 | ............ H01J 37/244 |

(Continued)

*Primary Examiner* — Jose L Couso

(57) ABSTRACT

There is provided an analyzer apparatus capable of generating crisp scanned images. In the analyzer apparatus, a sample is scanned with a probe such that a first signal and a second signal are emitted from the sample. The analyzer apparatus comprises: a first detector for detecting the first signal and producing a first detector signal; a second detector for detecting the second signal and producing a second detector signal; and an image processing unit operating (i) to produce a first scanned image and a second scanned image from the first detector signal and the second detector signal, respectively, (ii) to create a filter based on the second scanned image having a higher signal-to-noise ratio than that of the first scanned image, and (iii) to apply the filter to the first scanned image.

12 Claims, 2 Drawing Sheets

(58) Field of Classification Search
CPC ........... G01N 2223/6116; G06V 10/72; G06V 10/454; G06V 10/774; G06V 30/19173; G01B 9/02; H01J 2237/221; H01J 2237/222; H01J 2237/2817; H01J 2237/244; H01J 2237/2445; H01J 2237/24475; H01J 2237/24485; H01J 2237/24495; H01J 2237/2602; H01J 2237/28; H01J 37/244; H01J 37/22; H01J 37/28; H01J 37/263; H01J 2237/2448; H01J 2237/2611; H01J 2237/2806; H01L 21/00; H04N 3/26; G01Q 30/02; G01Q 30/04

See application file for complete search history.

(56) References Cited

U.S. PATENT DOCUMENTS

| | | | | |
|---|---|---|---|---|
| 2018/0047138 A1* | 2/2018 | Mori | ........................ | G06T 5/70 |
| 2018/0075594 A1* | 3/2018 | Brauer | ................ | G06V 10/454 |
| 2018/0240225 A1* | 8/2018 | Harada | .................. | G06T 7/001 |
| 2019/0272623 A1* | 9/2019 | Mack | ........................ | G06T 5/60 |
| 2021/0010959 A1* | 1/2021 | Shiratsuchi | ......... | H01J 37/3005 |

FOREIGN PATENT DOCUMENTS

| | | | | | |
|---|---|---|---|---|---|
| JP | 2011523711 A | * | 8/2011 | ........... | G01N 21/956 |
| JP | 201638708 A | | 3/2016 | | |
| JP | 2021077523 A | * | 5/2021 | ........... | H01J 37/222 |

\* cited by examiner

ANALYZER APPARATUS AND METHOD OF IMAGE PROCESSING

CROSS-REFERENCE TO RELATED APPLICATION

This application claims priority to Japanese Patent Application No. 2021-119539, filed Jul. 20, 2021, the disclosure of which is hereby incorporated by reference in its entirety.

BACKGROUND OF THE INVENTION

1. Field of the Invention

The present invention relates to an analyzer apparatus and image processing.

2. Description of the Related Art

In a scanning electron microscope, a scanned image can be produced by focusing an electron beam into an electron probe and scanning a sample with the electron probe. The scanning of the sample with the probe emits secondary electrons, backscattered electrons, characteristic X-rays, and so on from the sample. Therefore, if the scanning electron microscope is equipped with a secondary electron detector, a backscattered electron detector, and an X-ray detector, a secondary electron image, a backscattered electron image, and an elemental map can be obtained at the same time by scanning the sample with the electron probe.

Because secondary electrons are emitted at high efficiency, a secondary electron image with a sufficiently high signal-to-noise ratio can be obtained in a measurement as short as on the order of microseconds per pixel. Similarly, backscattered electrons are produced at high efficiency and so a backscattered electron image having a sufficiently high signal-to-noise ratio can be derived in a short measurement. In contrast, characteristic X-rays are produced at low efficiency and, therefore, in order to obtain an elemental map with a sufficiently high signal-to-noise ratio, a measurement as long as on the order of milliseconds per pixel is necessitated.

As disclosed, for example, in JP-A-2016-038708, noise in an elemental map with a low signal-to-noise ratio can be reduced by subjecting the map to image processing. In particular, by applying a spatial filter such as an averaging filter or a Gaussian filter to the elemental map, the intensities of pixels are accumulated, whereby the statistical error can be reduced. Consequently, the noise in the elemental map can be decreased.

With an averaging filter or Gaussian filter as described above, if the kernel size is increased, noise can be reduced more effectively but with concomitant blurring of the edges (contour).

On the other hand, if an edge preserving smoothing filter such as a bilateral filter or a guided filter is used, any image can be smoothed while leaving its edges. In an edge preserving smoothing filter, if there is a great difference in intensity between a pixel of interest and a reference pixel, weakened filter effect occurs. If not so, enhanced filter effect arises. As a result, noise reduction can be accomplished while leaving the edges.

However, in an elemental map obtained in a short time, statistical error may induce intensity variations greater than those produced by the edges. In this case, intensity differences due to statistical error are arithmetically processed as edges. This weakens the filter effect, so that a sharp image cannot be obtained.

SUMMARY OF THE INVENTION

In one aspect of the analyzer apparatus associated with the present invention, a sample is scanned with a probe such that a first signal and a second signal are emitted from the sample. The analyzer apparatus comprises: a first detector for detecting the first signal and producing a first detector signal; a second detector for detecting the second signal and producing a second detector signal; and an image processing unit operating (i) to produce a first and a second scanned images from the first and second detector signals, respectively, (ii) to create a filter based on the second scanned image that is higher in signal-to-noise ratio than the first scanned image, and (iii) to apply the filter to the first scanned image.

In this analyzer apparatus, edge information of the second scanned image with a higher signal-to-noise ratio is reflected in the filter which in turn can be applied to the first scanned image with a lower signal-to-noise ratio. Therefore, if the filter has a large kernel size, for example, the edges can be left. In consequence, the analyzer apparatus can produce the first scanned image in a crisper form.

One aspect of the method of image processing associated with the present invention comprises the steps of: scanning a sample with a probe such that a first signal and a second signal are emitted from the sample; detecting the first signal by a first detector and producing a first scanned image; detecting the second signal by a second detector and producing a second scanned image that is higher in signal-to-noise ratio than the first scanned image; and creating a filter based on the second scanned image and applying the filter to the first scanned image.

In this method of image processing, edge information of the second scanned image with a higher signal-to-noise ratio can be reflected in the filter which in turn is applied to the first scanned image with a lower signal-to-noise ratio. Therefore, if the used filter has a large kernel size, for example, the edges can be left. Consequently, this method of image processing can produce the first scanned image in a crisper form.

DETAILED DESCRIPTION OF THE INVENTION

The preferred embodiments of the present invention are hereinafter described in detail with reference to the drawings. It is to be understood that the embodiments provided below do not unduly restrict the scope and content of the present invention delineated by the appended claims and that not all the configurations described below are essential constituent components of the invention.

1. Scanning Electron Microscope

Figures 1, 2:
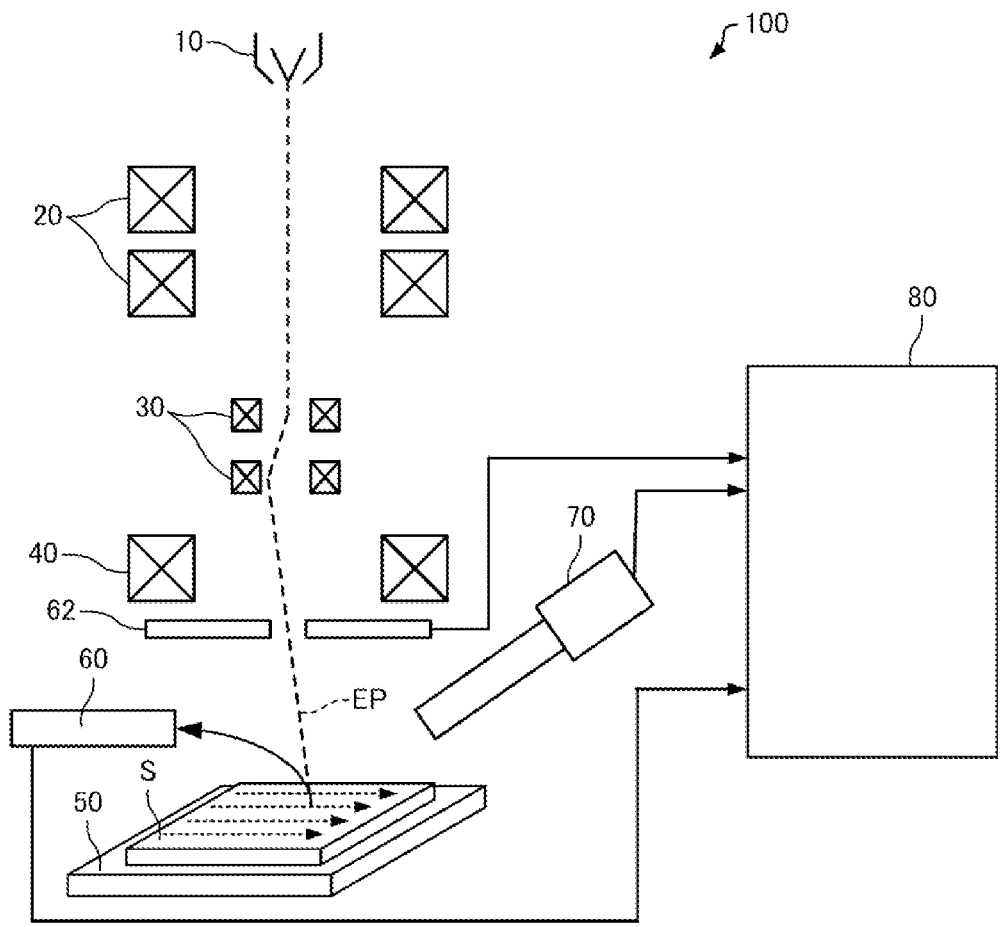
FIG. 1 is a diagram showing the configuration of an analyzer apparatus associated with one embodiment of the present invention.
FIG. 2 illustrates one example of a Gaussian filter.

First, an analyzer apparatus, 100, associated with one embodiment of the present invention is described by referring to FIG. 1, which shows the configuration of the analyzer apparatus 100.

The analyzer apparatus 100 is a scanning electron microscope which operates to scan a sample S with an electron probe EP and to produce scanned images. The analyzer apparatus 100 can produce secondary electron (SE) images, backscattered electron (BE) images, and elemental maps as such scanned images.

As also shown in FIG. 1, the analyzer apparatus 100 includes an electron gun 10, condenser lenses 20, scan coils 30, an objective lens 40, a sample stage 50, a secondary electron detector 60, a backscattered electron detector 62, an X-ray detector 70, and an image processing unit 80. The electron gun 10 emits an electron beam, for example, by accelerating electrons by means of an anode after the electrons are released from a cathode.

The condenser lenses 20 and the objective lens 40 cooperate to focus the electron beam emitted from the electron gun 10 into the electron probe EP. The diameter and current of the probe can be controlled by the condenser lenses 20. The scan coils 30 deflect the electron probe EP in two dimensions and, therefore, the sample S can be scanned with the electron probe EP.

The sample S is placed on the sample stage 50 which can hold the sample S thereon. The sample stage 50 has a drive mechanism for moving the sample S.

The secondary electron detector 60 detects secondary electrons released from the sample S in response to irradiation of the sample S with the electron beam. As a result, a secondary electron image can be generated. In this secondary electron image, there is contrast attributed to the topography of the sample S.

The backscattered electron detector 62 detects backscattered electrons emitted from the sample S in response to the irradiation of the sample S with the electron beam. A backscattered electron image can be obtained by scanning the sample S with the electron probe EP and detecting the backscattered electrons emitted from the sample S by the use of the backscattered electron detector 62. In the backscattered electron image, contrast is created by differences in atomic number.

When the sample S is irradiated with the electron beam, the X-ray detector 70 detects the resultant characteristic X-rays. For example, the X-ray detector 70 is an energy-dispersive X-ray detector. The X-ray detector 70 may also be a wavelength-dispersive X-ray spectrometer. An elemental map can be generated by scanning the sample S with the electron probe EP and detecting the characteristic X-rays released from the sample S by the use of the X-ray detector 70. The elemental map is constructed by measuring the X-ray intensities intrinsic to individual elements and imaging the different amounts of X-rays emitted from various points on the sample S.

The image processing unit 80 forms an elemental map and a backscattered electron image, creates a filter based on the backscattered electron image, and applies the filter to the elemental map. The image processing unit 80 includes a processor (such as a CPU (central processing unit)) and storage devices (such as a RAM (random access memory) and a ROM (read only memory)). Computer programs for execution of various kinds of processing and data are stored in the storage devices. The functions of the image processing unit 80 can be realized by executing computer programs by means of the processor.

2. Operation of the Analyzer Apparatus

In the analyzer apparatus 100, while the sample S is being scanned with the electron probe EP, secondary electrons are detected by the secondary electron detector 60, backscattered electrons are detected by the backscattered electron detector 62, and characteristic X-rays are detected by the X-ray detector 70. As a result, a secondary electron image, a backscattered electron image, and an elemental map can be generated at the same time. That is, these images and map can be created in the same scanning process.

For example, if some region on the sample S is irradiated with the electron beam, secondary electrons, backscattered electrons, and characteristic X-rays are released from the sample S. These are detected simultaneously by the secondary electron detector 60, backscattered electron detector 62, and X-ray detector 70, respectively. Therefore, pixels at the same coordinate on the secondary electron image, backscattered electron image, and elemental map which are generated in the same scanning process indicate the same location on the sample S. Furthermore, these secondary electron image, backscattered electron image, and elemental map generated in the same scanning process are made up of the same number of pixels. The pixels at the same coordinate represent the intensities of signals detected simultaneously by these detectors.

Note that secondary electrons and backscattered electrons are higher in emission efficiency than characteristic X-rays. Furthermore, the detection efficiency of the X-ray detector 70 at which characteristic X-rays are detected is lower than the detection efficiency of the secondary electron detector 60 at which secondary electrons are detected and than the detection efficiency of the backscattered electron detector 62 at which backscattered electrons are detected. For secondary electrons, the emission efficiency is the ratio of the number of secondary electrons emitted from the surface of the sample S to the number of electrons incident as the electron probe EP on the sample S. The detection efficiency is the ratio of electrons or X-rays detected as a signal to the electrons or X-rays emitted from the sample S.

Therefore, if a secondary electron image, a backscattered electron image, and an elemental map are produced from the same scanning process, the elemental map is lower in signal-to-noise ratio than the secondary electron image and the backscattered electron image.

3. Method of Image Processing

3.1. Filtering

The image processing unit 80 produces the elemental map and the backscattered electron image in the same scanning process, creates an edge preserving smoothing filter based on the backscattered electron image, and applies the created smoothing filter to the elemental map.

When the edge preserving smoothing filter is applied to the elemental map, if there is a great difference in intensity between the pixel of interest and the reference pixel, the filter effect is weakened. If not so, the filter effect is enhanced. Consequently, noise can be reduced while leaving the edges.

However, in an elemental map, intensity variations caused by statistical error may sometimes be greater than intensity variations caused by the edges. For example, if the measurement time is short, the intensity of X-rays per pixel of the elemental map is quite low, i.e., the number of X-rays, n, may be only a few or less. In this case, error is statistical error and given by $\sqrt{n}$. Where the number of X-rays per pixel is four, for example, there is a relative error of 50% ($\sqrt{4}/4$). That is, intensity variations caused by statistical error are greater than intensity variations caused by edges. In such a case, differences in strength due to statistical error are judged to be due to edges. As a result, the filter effect weakens.

Therefore, the image processing unit 80 smoothes the elemental map by creating a filter based on a backscattered electron image with a high signal-to-noise ratio and applying the filter to the elemental map.

The backscattered electron image has contrast that reflects the composition of the sample S. Therefore, the backscattered electron image is closer in physical meaning to an elemental map showing a distribution of elements than to a secondary electron image having contrast that reflects the topography of the sample S. Consequently, edge information of the backscattered reflected electron image is reflected in the elemental map by creating a filter based on the backscattered electron image and applying the filter to the elemental map.

3.2. Bilateral Filter

The image processing unit 80 uses a bilateral filter as an edge preserving smoothing filter which is a spatial filter capable of leaving edges and which is given by $$q_i = \sum_j W_{ij}(I) p_j \quad (1)$$

where $$W_{ij}(I) = \frac{1}{K_i} \exp\left(\frac{|x_i - x_j|^2}{-2\sigma_s^2}\right) \exp\left(\frac{|I_i - I_j|^2}{-2\sigma_r^2}\right)$$

p is an input image, q is an output image, i is a pixel of interest, j is a reference pixel, x is a coordinate, I is an intensity value of a guide image, $\sigma_s$ is a smoothing coefficient of a space, $\sigma_r$ is a smoothing coefficient of an intensity, and $K_i$ is the total of kernel values.

Where a backscattered electron image is used as a guide image for creating a filter and a bilateral filter is applied to an elemental map, the input image p is the elemental map and the intensity value I of the guide image is the intensity value of the backscattered electron image.

Figures 3, 4, 5:
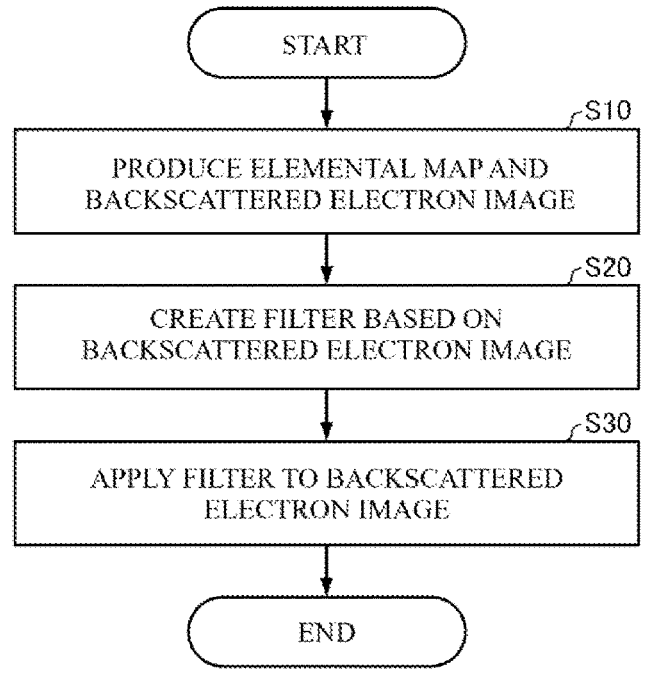
FIG. 3 illustrates one example of an edge preserving smoothing filter.
FIG. 4 illustrates one example of a bilateral filter.
FIG. 5 is a flowchart illustrating an image processing process flow.

The first exp function of $W_{ij}$ represents a Gaussian filter. One example of a Gaussian filter of 5×5 kernel size is shown in FIG. 2. The second exp function of $W_{ij}$ represents an edge preserving filter for leaving edges. FIG. 3 shows one example of an edge preserving filter of 5×5 kernel size.

As shown in FIG. 3, the value of each pixel in the edge preserving filter is determined according to the difference between the intensity value $I_i$ of the pixel of interest i and the intensity value $I_j$ of the reference pixel j while taking the pixel of interest i as a center. If the intensity value difference is small, the pixel value is close to unity. If the difference is great, the pixel value is close to 0. That is, the intensity value varies abruptly across an edge and so the filter effect is weak outside the edge.

FIG. 4 shows one example of the bilateral filter of 5×5 size. As shown, the bilateral filter can be created by multiplying together the values of corresponding pixels of the Gaussian filter and edge preserving filter.

The image processing unit 80 creates a filter while using a backscattered electron image as a guide image. Consequently, the output image q can preserve the edge information of the backscattered electron image with a high signal-to-noise ratio.

The image processing unit 80 sets a kernel size and an intensity smoothing coefficient $\sigma_r$. As the kernel size is increased, greater filter effect occurs. The intensity smoothing coefficient $\sigma_r$ is used to make a decision on an edge. As the value of the coefficient increases, the coefficient becomes less sensitive to intensity value differences. The kernel size and intensity smoothing coefficient $\sigma_r$ can be set to arbitrary values. For example, values entered by the user may also be used.

3.3. Image Processing Process Flow

FIG. 5 is a flowchart illustrating an image processing process flow of the image processing unit 80. First, the image processing unit 80 produces a backscattered electron image and an elemental map in the same scanning process (S10).

In the analyzer apparatus 100, while scanning the sample S with the electron probe EP, secondary electrons are detected by the secondary electron detector 60, backscattered electrons are detected by the backscattered electron detector 62, and characteristic X-rays are detected by the X-ray detector 70.

The secondary electron detector 60 sends a detection signal, which is responsive to the result of detection of secondary electrons, to the image processing unit 80. The processing unit 80 creates a secondary electron image based on the detection signal from the secondary electron detector 60.

The backscattered electron detector 62 sends a detection signal, which is responsive to the result of detection of backscattered electrons, to the image processing unit 80. The processing unit 80 creates a backscattered electron image based on the detection signal from the backscattered electron detector 62.

The X-ray detector 70 provides a detection signal, which is responsive to the result of the detection of characteristic X-rays, to the image processing unit 80. The processing unit 80 creates an elemental map based on the detection signal from the X-ray detector 70. Consequently, the image processing unit 80 can produce the elemental map and the backscattered electron image from the same scanning process.

Then, the image processing unit 80 creates a filter based on the backscattered electron image (S20) and applies the created filter to the elemental map (S30).

The image processing unit 80 takes the input image p as an elemental map and takes the intensity value I of the guide image as the intensity value of the backscattered electron image. The processing unit 80 subjects the elemental map to image processing by using an equation representing the aforementioned bilateral filter. Consequently, an elemental map having reduced noise can be generated while leaving the edges.

The image processing unit 80 displays the secondary electron image, backscattered electron image, and image-processed elemental map on a display device (not shown). In consequence, the elemental map with reduced noise can be displayed on the display device simultaneously with the secondary electron image and backscattered electron image.

4. Effects

In the analyzer apparatus 100, the sample S is scanned with the probe EP such that characteristic X-rays (one example of a first signal) and backscattered electrons (one example of a second signal) are emitted from the sample S. The analyzer apparatus 100 comprises: the X-ray detector 70 (one example of a first detector) for detecting the characteristic X-rays, the backscattered electron detector 62 (one example of a second detector) for detecting the backscattered electrons, and the image processing unit 80 operative (i) to produce an elemental map (one example of a first scanned image) and a backscattered electron image (one example of a second scanned image) having a higher signalto-noise ratio than that of the elemental map, (ii) to create a filter based on the backscattered electron image, and (iii) to apply the filter to the elemental map.

Therefore, in the analyzer apparatus 100, edge information of the backscattered electron image having a high signal-to-noise ratio can be reflected in the filter, and this filter can be applied to the elemental map having a lower signal-to-noise ratio and unclear edges. Accordingly, if even a filter having a large kernel size is used, the edges can be left. As a consequence, the analyzer apparatus 100 can produce a clear elemental map.

In the analyzer apparatus 100, the elemental map and the backscattered electron image are produced from the same scanning process and so a filter to be applied to the elemental map can be created easily. A filter to be applied to the elemental map is created by the analyzer apparatus 100 based on the backscattered electron image which has contrast reflecting the composition of the sample S. Hence, a filter to be applied to the elemental map can be created based on an image that is similar in physical meaning to the elemental map showing a distribution of elements.

A method of image processing for use in the analyzer apparatus 100 involves the steps of: scanning the sample S with the electron probe EP such that characteristic X-rays and backscattered electrons are emitted from the sample S; detecting the characteristic X-rays by the X-ray detector 70 and producing an elemental map; detecting the backscattered electrons by the backscattered electron detector 62 and producing a backscattered electron image having a higher signal-to-noise ratio than that of the elemental map; creating an edge preserving smoothing filter based on the backscattered electron image and applying the smoothing filter to the elemental map.

Therefore, in the method of image processing for use in the analyzer apparatus 100, edge information of the backscattered electron image with a higher signal-to-noise ratio can be reflected in the filter which in turn can be applied to the elemental map which is lower in signal-to-noise ratio and has unclear edges. Accordingly, if the used filter has a large kernel size, the edges can be left. Consequently, the method of image processing for use in the analyzer apparatus 100 can produce a crisp elemental map.

5. Modifications

Modifications of the analyzer apparatus associated with the above-described embodiments are next described. In the following description, only differences with the above-described analyzer apparatus 100 are set forth; a description of similarities is omitted.

5.1. First Modification

In the above embodiment, a bilateral filter is used as an edge preserving smoothing filter. In contrast, in a first modification, a guided filter is used as an edge preserving smoothing filter, which is given by the following set of Eqs. (2):

$$q_i = \overline{a}_i I_i + \overline{b}_i$$

$$\overline{a}_i = \frac{1}{|\omega|} \Sigma_{k \in \omega_i} a_k$$

$$\overline{b}_i = \frac{1}{|\omega|} \Sigma_{k \in \omega_i} b_k$$

$$a_k = \frac{\frac{1}{|\omega|} \Sigma_{i \in \omega_k} I_i p_i - \mu_k \overline{p_k}}{\sigma_k^2 + \epsilon}$$

$$b_k = \overline{p_k} - a_k \mu_k$$

$$\overline{p_k} = \frac{1}{|\omega|} \Sigma_{i \in \omega_i} p_i$$

where p is an input image, q is an output image, i is a pixel of interest, k is a reference pixel, I is the intensity value of a guide image, $\epsilon$ is a normalization constant ($\cong \sigma_r^2$), $\omega_k$ is a kernel size (window size), $\mu_k$ is the average of I's within $\omega_k$, $\sigma_k^2$ is the deviation of I's within $\omega_k$, and $|\omega|$ is the number of pixels within $\omega_k$.

Where a guided filter is applied to an elemental map while using a backscattered electron image as a guide image, the input image p is the elemental map. The intensity value I of the guide image is the intensity value of the backscattered electron image.

The image processing unit 80 sets the kernel size $\omega_k$ and the normalization constant $\epsilon$ of the filter. As the kernel size $\omega_k$ is increased, the filter effect is enhanced. The normalization constant $\epsilon$ is a coefficient similar to the smoothing coefficient $\sigma_r$ of the intensity of the bilateral filter. As the value of this constant increases, the filter becomes more insensitive to variations of intensity values within the window range. The kernel size $\omega_k$ and normalization constant $\epsilon$ of the filter can be set to any arbitrary value. For example, values entered by the user may also be used.

In this way, the image processing unit 80 can perform image processing while using a guided filter as an edge preserving smoothing filter. Even in this case, the image processing unit 80 can produce advantageous effects similar to those provided where a bilateral filter is used.

5.2. Second Modification

In the embodiment described above, when an edge preserving smoothing filter is applied to an elemental map, the map is correlated to the backscattered electron image because edge information of the backscattered electron image is used. In this way, in the edge preserving smoothing filter, the filtered scanned image varies depending on the species of the signal of the scanned image used as a guide image. Therefore, if two scanned images of different species of signal are used as guide images, for example, composite information about the two scanned images of different species of signal can be reflected in the filtered scanned image.

The analyzer apparatus 100 has the secondary electron detector 60 (one example of a second detector) for detecting secondary electrons (one example of a second signal) and the backscattered electron detector 62 (one example of a third detector) for detecting backscattered electrons (one example of a third signal). Therefore, the analyzer apparatus 100 can produce a secondary electron image (one example of a second scanned image) and a backscattered electron image (one example of a third scanned image) from the same scanning process.

In the image processing unit 80, an elemental map is filtered while using guide images which are respectively a secondary electron image possessing topographical information about the sample S and a backscattered electron image possessing compositional information about the sample S. As a result, the topographical information and the compositional information is reflected in the elemental map.

In the case of a bilateral filter, for example, a plurality of scanned images can be used as guide images in accordance with the following Eq. (3).

$$W_{ij}(I) = \frac{1}{K_i} \exp\left(\frac{|x_i - x_j|^2}{-2\sigma_s^2}\right) \exp\left(\frac{|I1_i - I1_j|^2}{-2\sigma_{r1}^2}\right) \exp\left(\frac{|I2_i - I2_j|^2}{-2\sigma_{r2}^2}\right) \quad (3)$$

where $I1$ is the intensity value of a first guide image, $I2$ is the intensity value of a second guide image, $\sigma_{r1}$ is a smoothing coefficient for the intensity of the first guide image, and $\sigma_{r2}$ is a smoothing coefficient for the intensity of the second guide image.

The input image can be filtered by using a secondary electron image and a backscattered electron image as guide images. This is achieved, for example, by using the intensity value of the secondary electron image as the intensity value $I1$ of the first guide image and using the intensity value of the backscattered electron image as the intensity value $I2$ of the second guide image.

In the formula for the bilateral filter as set forth in the above embodiment and in the formula for the guided filter as set forth in the first modification, for example, plural scanned images can be used as guide images by introducing the relationship, $$I_i = I1_i \times I2_i$$

where $I$ is the intensity value of each guide image.

In this way, the image processing unit 80 creates a filter based on two scanned images arising from different species of signal obtained in the same scanning process. Consequently, composite information of two scanned images produced from different species of signal can be reflected in the filtered scanned image.

5.3. Third Modification

In the above-described embodiment, a backscattered electron image is used as a guide image. An image used as such a guide image is preferably a scanned image having a signal-to-noise ratio higher than that of a scanned image to be filtered. For example, a secondary electron image may be used as a guide image. In this case, topographic information possessed by the secondary electron image is reflected in an elemental map. Furthermore, in the description of the above embodiment, an elemental map generated by detecting characteristic X-rays is filtered. Examples of a scanned image to be filtered include an elemental map generated by detecting soft X-rays and an elemental map generated by detecting Auger electrons.

5.4. Fourth Modification

In the description of the above embodiment, the analyzer apparatus 100 is a scanning electron microscope. However, the analyzer apparatus 100 is not restricted to a scanning electron microscope. For example, the analyzer apparatus 100 may be a scanning transmission electron microscope. In this case, dark fields images and bright field images can be used as guide images. Examples of scanned images to be filtered include an elemental map formed by detecting characteristic X-rays and an EELS (electron energy loss spectroscopy) image that is an elemental map generated from within a certain range of energies of an EELS spectrum.

The analyzer apparatus 100 may also be an X-ray analysis apparatus which can generate an elemental map by irradiating a sample with X-rays, moving the sample with a sample stage such that the sample is scanned with the X-rays, detecting X-rays transmitted through the sample, generating a scanned image, and detecting fluorescent X-rays emanating from the sample. In this case, the probe comprises X-rays. The scanned image produced by detecting the transmitted X-rays is used as a guide image. The elemental map is filtered.

It is to be understood that the foregoing embodiments and modifications are merely exemplary and that the invention is not restricted thereto. For example, the embodiments and modifications can be combined appropriately.

The present invention is not restricted to the foregoing embodiments but rather can be implemented in various modified forms. For example, the present invention embraces configurations (e.g., configurations identical in function, method, and results or identical in purpose and advantageous effects) which are substantially identical to the configurations described in any one of the above embodiments. Furthermore, the invention embraces configurations which are similar to the configurations described in any one of the above embodiments except that their nonessential portions have been replaced. Additionally, the invention embraces configurations which are identical in advantageous effects to, or which can achieve the same object as, the configurations described in any one of the above embodiments. Further, the invention embraces configurations which are similar to the configurations described in any one of the above embodiments except that a well-known technique is added.

The invention claimed is:

1. An analyzer apparatus in which a sample is scanned with a probe such that a first signal and a second signal are emitted from the sample, said analyzer apparatus comprising:
   a first detector for detecting the first signal and producing a first detector signal;
   a second detector for detecting the second signal and producing a second detector signal; and
   an image processing unit operating to produce a first scanned image and a second scanned image from the first detector signal and the second detector signal, respectively, to create a filter based on the second scanned image having a higher signal-to-noise ratio than that of the first scanned image, and to apply the filter to the first scanned image.

2. The analyzer apparatus as set forth in claim 1, wherein said first scanned image and said second scanned image are obtained in the same scanning process.

3. The analyzer apparatus as set forth in claim 1, wherein said second signal is produced at a higher efficiency than said first signal.

4. The analyzer apparatus as set forth in claim 1, wherein said second detector has a detection efficiency higher than that of said first detector.

5. The analyzer apparatus as set forth in claim 1, wherein said probe is an electron probe formed by focusing an electron beam.

6. The analyzer apparatus as set forth in claim 1, wherein said first scanned image is an elemental map.

7. The analyzer apparatus as set forth in claim 6, wherein said first signal comprises X-rays while said second signal comprises electrons.

8. The analyzer apparatus as set forth in claim 1, further comprising a third detector for detecting a third signal emitted from the sample in response to the scanning of said sample with said probe and producing a third detector signal, and wherein said image processing unit operates to produce a third scanned image having a higher signal-to-noise ratio than that of said first scanned image from the third detector signal and to create said filter based on the second and third scanned images.

9. The analyzer apparatus as set forth in claim 1, wherein said filter is an edge preserving smoothing filter.

10. The analyzer apparatus as set forth in claim 9, wherein said image processing unit applies a guided filter, which takes said second scanned image as a guide image, to said first scanned image.

11. The analyzer apparatus as set forth in claim 9, wherein said edge preserving smoothing filter is a bilateral filter.

12. A method of image processing, comprising the steps of:
- scanning a sample with a probe such that a first signal and a second signal are emitted from the sample;
- detecting the first signal by a first detector and producing a first scanned image;
- detecting the second signal by a second detector and producing a second scanned image that is higher in signal-to-noise ratio than the first scanned image; and
- creating a filter based on the second scanned image and applying the filter to the first scanned image.

* * * * *